United States Patent [19]
Sievenpiper

[11] 3,765,690
[45] Oct. 16, 1973

[54] COMPOSITE SEAL
[75] Inventor: Ward Sievenpiper, Milgrove, N.Y.
[73] Assignee: A-T-O Inc., Willoughby, Ohio
[22] Filed: Jan. 21, 1971
[21] Appl. No.: 108,279

[52] U.S. Cl. .............................. 277/121, 277/177
[51] Int. Cl. ............................................ F16j 15/24
[58] Field of Search ...................... 277/24, 190, 205, 277/117, 121, 143, 144, 182, 177, 178, 176; 92/242, 250

[56] References Cited
UNITED STATES PATENTS

| | | | |
|---|---|---|---|
| 2,914,369 | 11/1959 | Hayman | 92/242 |
| 3,254,898 | 6/1966 | Herbenar et al. | 277/176 |
| 2,708,573 | 5/1955 | Rovoldt | 277/188 X |
| 3,146,683 | 9/1964 | Hoffmann | 277/188 |
| 2,687,335 | 8/1954 | Bowerman | 277/205 |
| 3,271,038 | 9/1966 | Bastow | 277/205 |
| 3,606,356 | 9/1971 | Beroset | 277/190 |

FOREIGN PATENTS OR APPLICATIONS

| 1,019,523 | 2/1966 | Great Britain | 277/205 |

Primary Examiner—Samuel B. Rothberg
Assistant Examiner—Robert I. Smith
Attorney—Christel & Bean

[57] ABSTRACT

A pair of annular sealing members captively disposed in axial abutting relation about a reciprocating member and formed of synthetic plastic materials of different degrees of hardness. The softer member has total memory coupled with a quick response to accept severe deflection of the reciprocating member and the harder member, capable of enduring higher pressures, serves as a back-up for the softer member to prevent extrusion. The softer member moves relative to the harder member under high pressures in an arrangement relieving the frictional force acting against the sealing lip of the softer member and loading the harder member. In lighter duty applications a rod wiper can be combined with the harder member, and the harder member can be elongated for added bearing capability.

14 Claims, 10 Drawing Figures

Patented Oct. 16, 1973
3,765,690
2 Sheets-Sheet 1
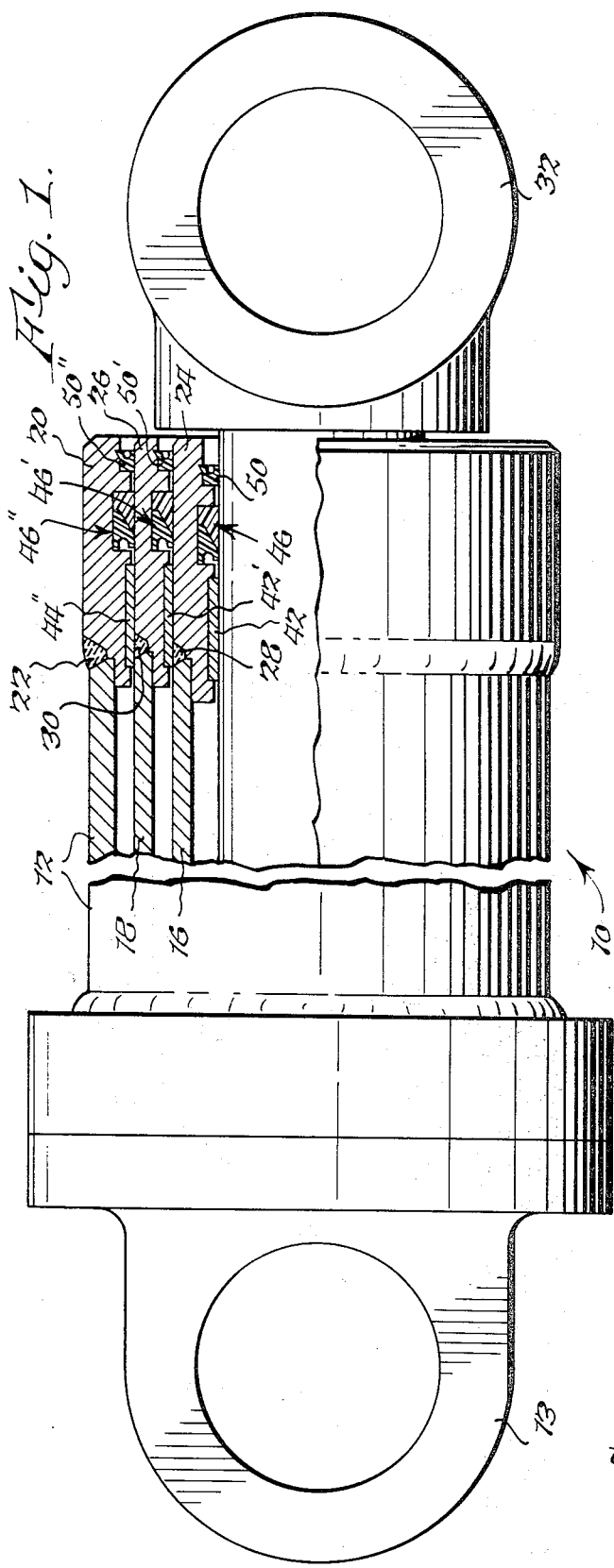
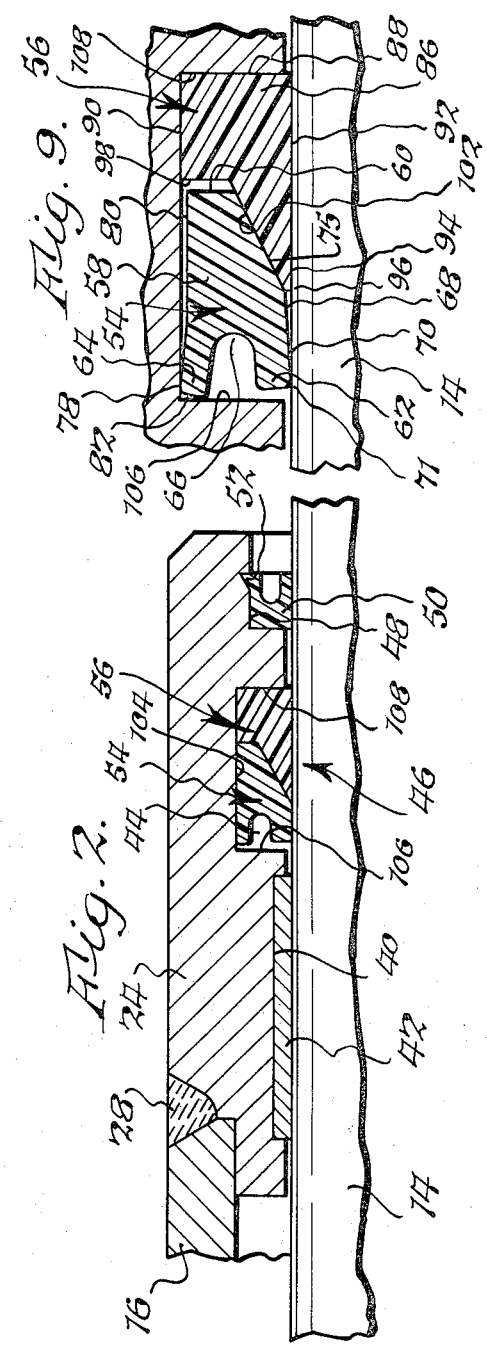
INVENTOR.
Ward Sievenpiper
BY
Christel & Bean
ATTORNEYS.

Patented Oct. 16, 1973
3,765,690
2 Sheets-Sheet 2
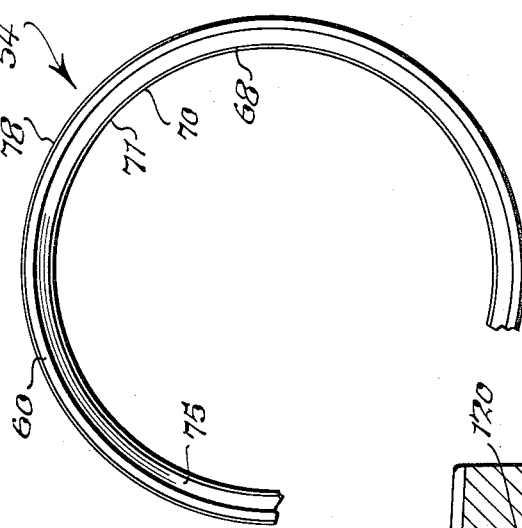
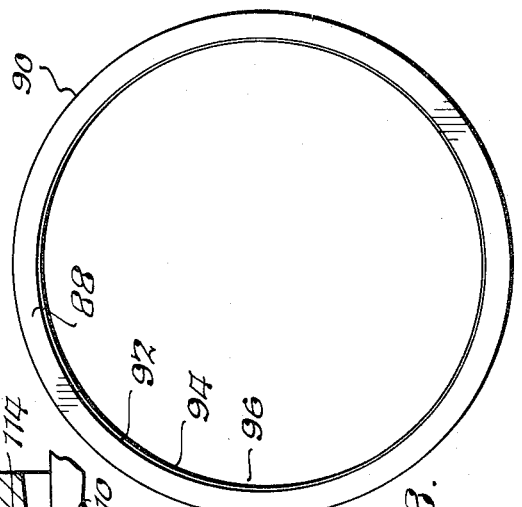
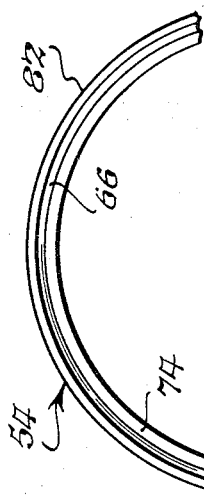
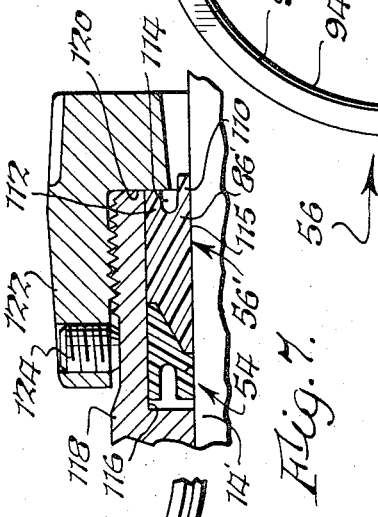
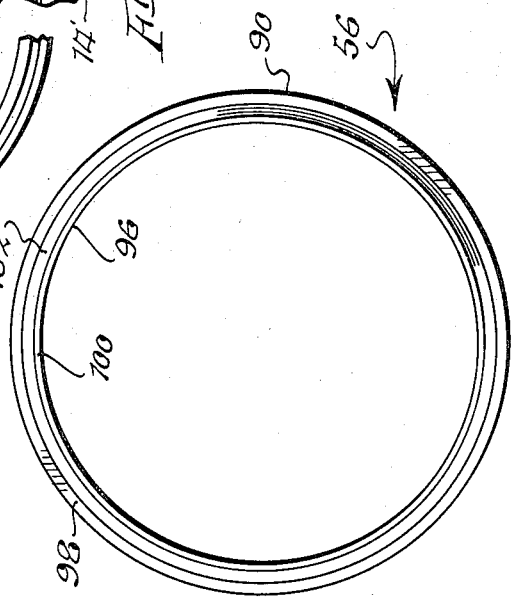
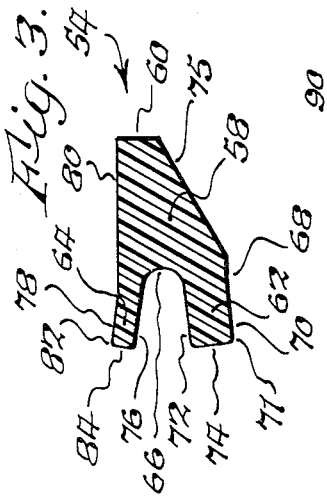
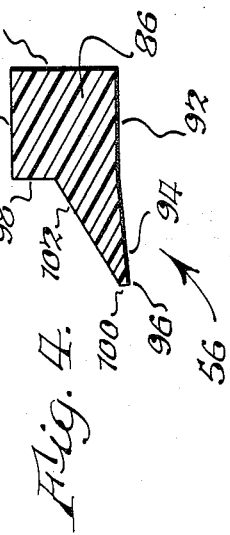
INVENTOR.
Ward Sievenpiper
BY
Christel & Bean
ATTORNEYS.

COMPOSITE SEAL

BACKGROUND OF THE INVENTION

This invention relates to seals for hydraulic actuators and, more particularly, to a new and useful rod seal of composite design.

Various types of hydraulic actuator seals have been desired. Generally, these seals are V or cup shaped in cross section and are used either singularly or in packings comprised of two or more such seals in an abutting, back-to face relationship. Where such seals are made of relatively soft materials capable of resiliently yielding upon rod deflection without leakage, they are subject to wear resulting in a short useful life, particularly under high pressure conditions. Another common problem encountered with such seals is their susceptability to extrusion, again shortening their useful life. When such seals are formed of harder materials capable of withstanding higher stresses and pressures they are inclined to become somewhat permanently distorted with rod deflection or, at least, do not respond quickly enough to avoid leakage.

SUMMARY OF THE INVENTION

A primary object of this invention is to provide a seal for hydraulic cylinders which will remain leak-free under high pressure conditions and which has an extremely long useful life.

Another object of this invention is to accomplish the foregoing with a seal having the ability to accept severe rod deflection and which exhibits total memory and quick response.

Still another object of this invention is to accomplish the foregoing with seal members which can be readily molded of available materials so as to provide a practical solution to the above-noted problems encountered in the prior art. The composite seal of the present invention is characterized by the provision of a pair of annular sealing members captively disposed in an abutting relation about a piston rod or other tubular element, the members being formed of materials having different hardness characteristics. The softer member has total memory and a quick response in order to accommodate rod deflection without leakage. Under high pressure conditions, the softer member is forced against the harder member and caused to stretch radially to relieve the bearing pressure between the softer member's sealing lip and the outer surface of the rod, and the compression between the members loads the harder member to increase the bearing pressure of the harder member's sealing lip against the outer surface of the rod effecting a tighter seal therebetween to better withstand high pressures.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a side elevational view, partially in section, of an hydraulic cylinder incorporating the composite seal of the present invention, the intermediate portion of the cylinder being broken away for ease of illustration;

FIG. 2 is a fragmentary sectional view, on an enlarged scale, showing the composite seal of this invention as it would appear under a relatively high pressure condition;

FIG. 3 is a fragmentary cross sectional view, on an enlarged scale, of one of the members of the composite seal of this invention;

FIG. 4 is a fragmentary cross sectional view, on an enlarged scale, of the other member of the composite seal of the present invention;

FIG. 5 is a front elevational view of the seal member of FIG. 3.

FIG. 6 is a rear elevational view of the seal member of FIG. 2;

FIG. 7 is a front elevational view of the seal member of FIG. 4;

FIG. 8 is a rear elevational view of the seal member of FIG. 4;

FIG. 9 is a fragmentary sectional view similar to that of FIG. 2 but on a larger scale and showing the composite seal of this invention as it would appear under a relatively low pressure condition; and FIG. 10 is a fragmentary sectional view, on an enlarged scale, of another form of the present invention as it would appear under a relatively high pressure condition.

DETAILED DESCRIPTION OF THE ILLUSTRATED EMBODIMENT

Referring now in detail to the drawings, there is shown in FIG. 1 a double acting hydraulic cylinder, generally designated 10, of the telescopic type including a cylindrical casing 12 and a plurality of concentric, hollow piston rods 14 (which also can be of solid section), 16 and 18 disposed in telescopic relation. Rods 14, 16 and 18 are adapted to be axially reciprocated relative to each other and to casing 12 and are connected at their inner ends to suitable pistons (not shown) in a manner well known in the art. Pressure is successively applied to the pistons to extend and retract their respective rods sequentially in stages starting from the innermost rod 14 and working radially outwardly. Since such piston arrangements are conventional and, per se, form no part of this invention, no further showing or description thereof is necessary. While the composite seal of the present invention can be used advantageously with an hydraulic cylinder of the type illustrated, it should be understood that it is in no way restricted to use with such a cylinder, but has utility in a wide variety of applications under both low and high pressure conditions.

Housing 12 terminates at one end in an eye 13 for mounting or otherwise securing cylinder 10 to a suitable support. The other end of housing 12 is provided with an annular collar 20 welded onto housing 12 as at 22. Annular collars 24 and 26 are provided on the distal ends of rods 16 and 18 and are secured thereto as by means of welds 28 and 30. The outer end of the innermost rod 14 is threaded or otherwise attached to an eye member 32 adapted to be connected to a mechanical load.

Since each collar is similar in construction except for variations in size, it is believed that a detailed description of only collar 24 together with its sealing elements and bearings will suffice, it being understood that identical reference characters primed and double primed will be applied to corresponding elements of collars 26 and 20.

As shown in FIG. 2, collar 24 surrounds piston rod 14 and is provided with an annular groove or cavity 40 for receiving a sleeve bearing 42 in contact with piston rod 14. Another annular groove or cavity 44 axially spaced from groove 40 is provided in collar 24 for receiving the composite seal 46 of the present invention as will hereinafter be more fully described. A third annular groove or cavity 48 axially spaced from groove 44 is provided in collar 24 for receiving an annular rod wiper 50 held in place by means of a retaining lip 52 formed in groove 48, such wiper 50 being effective to scrape and wipe rod 14 clean. Rod wiper 50 is described in greater detail in pending application Ser. No. 8,175 filed Feb. 3, 1970, to which reference can be made.

In accordance with the present invention, seal 46 is comprised of a pair of annular sealing members, hereinafter referred to as a "low pressure" member 54 and a "high pressure" member 56 disposed in groove 44 to provide a fluid tight seal between adjacent piston rods 14 and 16. Low pressure member 54 is composed of a resiliently yieldable synthetic plastic material and comprises an annular body 58 (FIGS. 3, 5 and 6) having a generally planar axial end face 60. Body 58 is formed at its opposite end into a first annular flange 62 and a second annular flange 64 extending outwardly from body 58 in a slightly divergent relation and joined together at their inner ends to form a cup-shaped cavity 66. Flange 62 extends generally axially from body 58 and has an inner circumferential wall comprised of a straight axially extending portion 68 and an inclined portion 70 extending slightly radially inwardly of portion 68 and terminating in a sealing edge or lip 71 which has an interference fit with rod 14. Flange 62 has an outer circumferential wall 72 extending generally parallel to the inclined portion 70 and an end face 74 joining inclined portion 70 to outer wall 72 and extending in a direction generally normal thereto. Body 58 has an inclined cam surface 75 extending upwardly at an angle from the inner end of straight portion 68 to the inner end of end face 60.

Flange 64 extends outwardly from body 58 and has an inner circumferential wall 76 inclined relative to the axis of body 58 so as to extend slightly radially outwardly from body 58. Flange 64 also has an outer circumferential wall 78 generally parallel to wall 76. Body 58 is provided with an outer wall 80 generally parallel with the axis of body 58 and from end face 60 and terminating at the inner end of wall 78. Wall 78 of flange 64 terminates at an annular lip 82 formed between wall 78 and an inclined end face 84 of flange 64. The inner end of end face 84 joins the inner wall 76 at substantially a right angle. The thickness of flange 64, measured between wall surfaces 76, 78 is on the order of one-half the corresponding dimension of flange 62.

High pressure member 56 comprises an annular body 86 (FIGS. 4, 7 and 8) and also is composed of a somewhat resiliently yieldable synthetic plastic material but of a higher durometer rating than low pressure member 54. Annular body 86 has a radial end face 88, an outer peripheral wall 90 and an inner wall 92 extending substantially parallel to wall 90 and to the cylinder axis. Inner wall 92 terminates in an inclined portion 94 extending slightly radially inwardly of inner wall 92 to form a sealing edge of lip 96 having an inside diameter of slightly lesser extent than the diameter of inner wall 92. Body 86 has an annular abutment shoulder 98 generally parallel to end face 88 and normal to outer wall 90, and an end face 100, also generally parallel to face 88. An inclined surface 102 extends downwardly at an angle from the inner end of shoulder 98 to the outer end of face 100; the inner end of which joins wall portion 94 to form lip 96. This inclined surface 102 serves as a seat on which low pressure member 54 rides when the two pressure members are axially compressed together by pressure fluid, as will be described.

The low and high pressure members 54 and 56 preferably are molded each of integral, one piece construction, to the shape shown in FIGS. 3 and 4 in any size desired. A suitable synthetic plastic material for member 54 is urethane having a durometer rating of about 80. High pressure member 56 also can be formed of urethane but of a higher durometer rating and impregnated with a filler, such as glass fibers for example, to increase the hardness thereof for reasons which will become apparent. While the specified urethanes are presently believed to be preferably, it is recognized that other synthetic plastics exhibiting the necessary characteristics can be utilized.

Composite seal 46 is captively contained within annular groove 44 which is concentric with the axis of piston rod 14 and has a generally rectangular cavity configuration in radial section. Groove 44 is defined by an inner annular wall 104, and a pair of axially spaced end walls 106 and 108 disposed in planes perpendicular to the axis of rod 14. Sealing members 54 and 56 are fitted into groove 44 in operative position within hydraulic cylinder 10 and initially assume the low pressure condition shown in FIG. 1. Specifically, high pressure member 56 is disposed in groove 44 with end face 88 engaging end wall 108, the outer wall 90 engaging wall 104 and the inner wall 92 resting against rod 14 with lip 96 in sealing engagement with rod 14. Low pressure member 54 is disposed in groove 44 with inclined surface 75 resting on inclined surface 102 of member 56, inclined portion 70 of flange 62 engaging rod 14, and portions of flange 64 engaging wall 104 and 106, respectively. A slight clearance exists between face 60 and shoulder 98 of members 54 and 56 and between the outer wall 80 of member 54 and groove wall 104 under low pressure conditions to provide axial and transverse or circumferential clearance for movement of low pressure member 54 relative to member 56 under high pressure conditions, as will be described. Lips 71 and 82 of flanges 62 and 64 are in sealing contact with rod 14 and groove wall 104, respectively, and both members 54 and 56 are in sealing engagement about the surface of rod 14.

A significant feature of this invention is the provision of low pressure member 54 formed of a relatively soft i.e. more readily yieldable material having substantially total memory or resistance to permanent set coupled with a quick response to its original shape when the distorting force is relieved. This is important in order to accommodate severe rod deflection caused by mechanical loads acting on the outer end of rod 14, without leakage. Although member 56 has good memory, its response is slower due to the harder material of which it is composed, rendering it susceptible to leakage during rod deflection if used alone. The quick response of member 54 and its dynamic seal lip 71 precludes such leakage. Sealing engagement of lip 71 against rod 14, caused by the interference fit therebetween is augmented by the action of pressure fluid in cavity 66, and is maintained even under severe distortion.

Under high pressure conditions member 54, which is on the high pressure side of the seal, is moved by the pressure fluid axially rearwardly against shoulder 98 of high pressure member 56. As member 54 is forced rearwardly in sliding engagement with inclined surface 102, body 58 is deflected radially outwardly by the camming or wedging action of surface 102 until outer wall 80 of member 54 engages groove wall 104. High pressure member 56, formed of a harder synthetic plastic material, serves as a back-up for the softer member 54 and prevents extrusion of the softer member 54 between collar 24 and rod 14. As the member 54 is forced against and onto member 56, to the position shown in FIG. 2, the softer member 54 is deflected radially outwardly, enlarging the inside diameter thereof and partially relieving the bearing pressure or frictional force between lip 71 and the outer surface of rod 14. This is a particularly significant feature of the present invention because it reduces wear on the sealing lip 71 of the softer member 54 thereby prolonging the useful life thereof. At the same time, high pressure member 56 is loaded by member 54 to increase the bearing pressure of lip 96 against the outer surface of rod 14 effecting a tighter seal therebetween capable of withstanding high pressure conditions. Therefore, seal member 56 becomes most efficient under high pressure conditions.

High pressure member 56 can have a retainer shoulder like that shown on wiper 50, and cavity wall 104 can be formed to receive the same, but wall 108 is of such depth that an additional retainer usually will not be necessary.

FIG. 10 illustrates another form of the invention in which the rod wiper is combined with the high pressure sealing member as an integral, unitary part thereof. As shown in FIG. 10, high pressure member 56' is formed at the end thereof opposite low pressure member 54 to provide a rod wiper portion comprised of a pair of annular flanges 110 and 112 extending axially outwardly from body 86' in a slightly divergent relation and joined together at their inner ends to form a cup-shaped cavity 114. Inner flange 110 is inclined or has an inclined lower surface, similar to flange 62 in FIG. 3, and the inner edge of flange 110 has an interference fit with rod 14' to wiper the same and thereby function in the same manner as wiper 50 of FIG. 1. Indeed, the rod wiper portion of member 56' can be identical to wiper 50, except that it is molded as part of seal member 56'. This form of the invention is suitable for lighter duty applications and is more economical than the separate sealing and rod wiper arrangement of FIG. 2. Also body 86' can be axially elongated as shown in FIG. 10 to increase the area of the inner bearing surface 115 thereof which is a generally cylindrical, axial surface like that shown at 92 in FIG. 4 but considerably elongated. This increases the bearing capability of seal member 56', and makes it possible to eliminate the separate sleeve bearing of FIG. 2 in lighter duty applications, thereby realizing further savings in cost.

In the form of the invention shown in FIG. 10, sealing members 54 and 56' can be slid axially over rod 14 into the annular cavity 116 provided in a casing 118 and held in place against an abutment shoulder 120 provided on a cartridge nut 122 threaded on the end of casing 118 and fixed in place by means of a set screw 124. Member 56' is formed of the same material as member 56 first described and is operative in conjunction with member 54 in the same manner as member 56, being otherwise identical thereto.

From the foregoing, it is apparent that the objects of the present invention have been fully accomplished. As a result of this invention, an improved composite seal is provided having a pair of annular sealing members disposed in a side by side relation, said members being formed of materials having different hardnesses. The softer member effectively seals under low pressure conditions and has total memory and a quick response. Under high pressure conditions, the softer member moves axially toward the harder member and is stretched radially whereby the frictional force acting between the softer member's sealing lip and the rod is relieved. The softer member also loads the harder member to increase the bearing pressure of its sealing lip against the rod. Extrusion of the softer member is prevented by the increased pressure imparted to the harder member's sealing lip. Thus, the composite seal of the present invention is leak-proof and has the capability of accommodating severe rod deflection thereby increasing the useful life thereof.

Preferred embodiments of this invention having been described in detail, it is to be understood that this has been done by way of illustration only.

I Claim:

1. A composite seal for piston rods and the like comprising: a first annular member and a separate second annular member disposed in an axial abutting relation and captively retained about the outer surface of a relatively reciprocating member, said first and second annular members having portions, respectively, in sealing engagement with said reciprocating member, said first annular member being formed of a synthetic plastic material and said second annular member being formed of a synthetic plastic material of a higher durometer rating than said first member, said first annular member comprising a body terminating in an annular end face and said second annular member comprising a body having an annular abutment shoulder intermediate the opposite ends thereof facing said first member end face in axially spaced relation thereto under low pressure conditions, said members having coacting surfaces causing said first member to move relative to said second member under high pressure conditions with said first member end face approaching said second member shoulder and also causing said first annular member to be stretched radially outwardly thereby relieving the frictional force between said sealing engagement portion of said first member and the outer surface of said reciprocating member, said coacting surface of said first annular member comprising an annular inclined surface extending radially inwardly from said first annular body end face and the coacting surface of said second annular member comprising an annular inclined surface extending radially inwardly from said shoulder toward said first annular member and complementary to said inclined surface of said first annular member.

2. A composite seal according to claim 1 wherein said first annular member body is provided with a first and second annular flange at the end opposite said annular end face, said flanges being spaced apart radially and defining an annular groove therebetween.

3. a composite seal according to claim 2 wherein said first annular flange has an inclined inner wall portion terminating in a sealing lip having an interference fit with said reciprocating member.

4. A composite seal according to claim 2 in combination with an hydraulic actuator having a hollow cylindrical member encircling said reciprocating member, said hollow member having an annular wall cavity confining said seal with said first flange in sealing engagement with said reciprocating member and said second flange in sealing engagement with the cavity wall, said annular groove facing the high pressure side of said actuator.

5 A composite seal according to claim 1 wherein said radial stretching of said first member is accompanied by radial loading of said second member to increase the sealing engagement thereof against said reciprocating member.

6. A composite seal according to claim 1 in combination with a fluid cylinder having an outer member with said reciprocating member being relatively reciprocable therein, an annular groove formed in the inner surface of said outer member, said composite seal being captively retained in said annular groove, said first and second seal members being axially relatively movable to vary the relative action thereof under different pressure conditions, and said groove being of an axial dimension permitting such relative movement.

7. A composite seal according to claim 1 wherein said second annular member is provided with means for wiping said reciprocating member.

8. A composite seal according to claim 7 wherein said wiping means comprises a first annular flange extending generally axially from said second annular member in a direction away from said first annular member and adapted to wipe said reciprocating member.

9. A composite seal according to claim 8 wherein said wiping means includes a second annular flange extending generally axially from said second annular member in a direction away from said first annular member, said flanges being spaced apart radially thereby defining an annular groove therebetween, the spacing between said flanges increasing gradually in an axial direction from said second annular member, said first flange extending axially beyond said second flange.

10. A composite seal according to claim 1 wherein said second annular member is provided with an elongated generally cylindrical axial surface in slide bearing engagement with said reciprocating member to also function as a bearing.

11. A composite seal according to claim 10 wherein said second annular member is provided with an end portion having an annular flange extending generally axially from said second annular member in a direction away from said first annular member and having a surface extending from said axial surface adapted to wipe said reciprocating member.

12. A composite seal according to claim 1 wherein said end face and said abutment shoulder of said first and second annular members, respectively, are flat and lie in transaxial planes normal to the axes of said annular members.

13. A composite seal according to claim 1 wherein said second annular member body includes a first end face, a second end face of lesser area than said first face, said abutment shoulder being intermediate said end faces, said inclined surface of said second member extending radially outwardly from said second end face to said shoulder.

14. A composite seal according to claim 13 wherein said second annular member has an inner wall comprising a straight portion parallel to the axis of said second annular member, and an inclined portion extending from said straight portion in a direction slightly radially inwardly thereof and terminating in a lip in fluid sealing engagement with the outer surface of said reciprocating member.

* * * * *